April 27, 1948.  F. B. HUNTER  2,440,608
RELIEF VALVE
Filed May 5, 1945
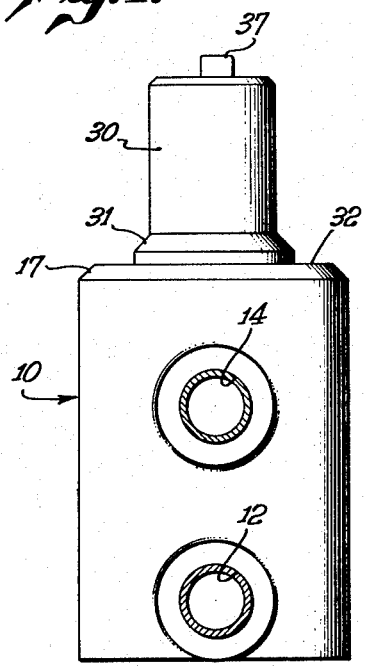
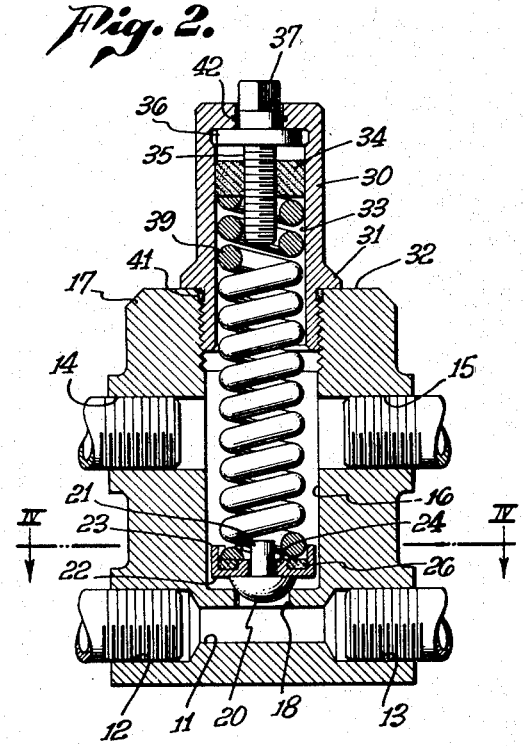
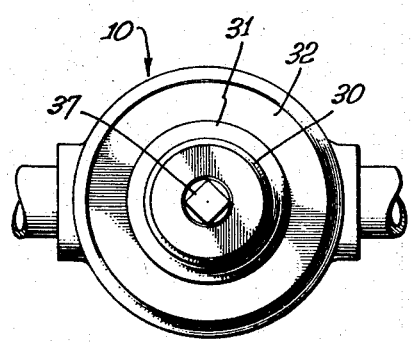
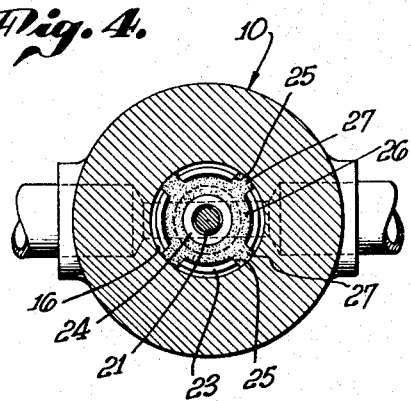
Frank B. Hunter
INVENTOR.
BY
ATTORNEY.

Patented Apr. 27, 1948

2,440,608

UNITED STATES PATENT OFFICE 2,440,608

RELIEF VALVE

Frank B. Hunter, Roscoe, Calif., assignor to Casimir A. Miketta, Beverly Hills, Calif.

Application May 5, 1945, Serial No. 592,114

7 Claims. (Cl. 137—53)

My invention relates to pressure relief valves adapted to be inserted into a fluid line in order to relieve the pressure when it exceeds a predetermined amount.

Relief valves and pop-off valves of many kinds and description have been devised in the past for the purpose of relieving fluid pressure. Some have been designed for insertion in liquid lines and others in air lines. Installations of different kinds require valves which will accommodate exceedingly high pressures, exceedingly low pressures and pressures at all stages between the two. Since there has been a definite limit to the variation in pressure which one valve can accommodate, a great number of different styles and different types of valves have been devised. Needless to say, few, if any valves, have been devised which are suited to all pressures, but valves which are capable of accommodating wide ranges of pressures are highly desirable in that one valve can be suited to many purposes.

One of the difficulties, however, in designing valves of this kind is to so construct the moving parts that they will operate silently regardless of the pressure to which they are subjected. Also, because of the fact that when valves of this kind are used under very high pressures, some of the parts are apt to need replacement and it is highly advantageous to be able to quickly and effectively replace the part needing replacement without having to send the valve to a shop for dismantling and repair.

It is therefore among the objects of my invention to provide a new and improved relief valve having a design which permits the valve to be used in a wide variety of high and low pressure installations, the parts of which are so constructed that they can be readily removed and replaced in the field.

Another object of my invention is to provide a relief valve adapted to use in high and low pressure work which is silent in its operation and in which chattering has been reduced to a minimum.

Still another object of my invention is to provide a relief valve in which all of the working parts can be removed as a unit and which can be readily separated one from another after removal so that worn parts may be quickly and readily replaced and reinserted into the valve.

A still further object is to provide a valve element which is so shaped that it will seat positively upon the valve seat whether or not the remaining portions of the valve are in precise alignment, thereby making it unnecessary to hold close tolerances in the manufacture of the several parts.

A further object still is to provide a relief valve of simplified construction which incorporates a device for adjusting the valve to different pressures which is simple in its construction and serves simultaneously the purposes of a packing and a spring keeper.

With these and other objects in view, my invention consists in the construction, arrangement and combination of the various parts of my device whereby the objects contemplated are attained, as hereinafter more fully set forth, pointed out in my claims and illustrated in the accompanying drawings, in which:

Fig. 1 is a side elevational view of the valve device.

Fig. 2 is a longitudinal sectional view of the valve device.

Fig. 3 is a top view.

Fig. 4 is a cross-sectional view on the line IV—IV of Fig. 2.

In the construction of relief valves and particularly relief valves which are expected to handle liquids and gases under high pressure, extreme difficulty has been experienced in constructing the moving valve parts so that they will not chatter when they are forced into a released or pop-off position. The greater the pressure which is retained by the valve, the more likely the parts are to chatter, either just prior to or just after the pressure is released. To reduce chatter, some valves have been designed and built to relatively small tolerances so that the moving parts fit rather snugly one within another and in that way minimize chattering. Construction of this kind is invariably expensive and when subjected to rough usage, valves so built are apt to get out of order.

Furthermore, when the moving parts are made to a small tolerance, it is difficult and frequently impossible to remove the valve parts in the field and replace new parts when the valve parts become defective. On the other hand, when valves are made to a rather wide tolerance so that they can be easily serviced and repaired in the field, they are apt to have such a loose relationship between the moving parts that chattering cannot be avoided. It therefore becomes highly desirable to be able to produce a quiet-acting valve adapted to use under high pressures, but which at the same time can be simply and inexpensively constructed and which is so assembled that it can be readily serviced outside of the shop.

In the embodiment chosen to illustrate my device, there is provided a valve body 10 of somewhat conventional design which may have any desired shape but which in the drawings is shown as a cast block large enough to accommodate a pair of passages extending through it. Within the valve body is a high pressure or inlet passage 11 having threaded ports 12 and 13 adapted to be connected into a pressure line. The valve body is likewise provided with a pair of relief ports 14 and 15 which, in this embodiment, are shown in alignment and extending transversely across the body of the valve in parallel relationship with the passage 11 thereby forming a relief passage.

Within the valve body is a transverse valve chamber 16 substantially larger in diameter than the ports 12, 13, 14 and 15. The chamber extends inwardly from one side 17, extends across the axis of the ports 14, 15 and communicates with the passage 11 by means of a relief valve port 18.

The annular edge on one side of the relief valve port adjacent the valve chamber provides an annular valve seat.

The valve device itself consists of a valve assembly which acts as a unit and comprises a valve element 20 which, in the form illustrated, has a round head and appears rivet-like in section, as best illustrated in Fig. 2. On the opposite side of the valve element from the rounded head is a stem 21.

Immediately adjacent the valve element is a disc-like element 22 which acts in a sense like a valve keeper. The disc-like element is annular in shape and is provided with an outer lip 23 and an inner lip 24. The inner lip surrounds the stem 21 and provides a guide for this portion of the valve element. The outer lip 23 is provided with recesses 25.

Between the lips of the disc-like element there is positioned a sheet of preferably a non-metallic material 26 which substantially fills the space between the lips and which has extending outwardly therefrom fingers 27 which pass through the recesses 25 so that the outermost edges of the fingers are in free, sliding relationship to the wall of the valve chamber. The sheet may be pressed into place between the lips or retained loosely therein, as occasion requires.

For keeping the valve element in place, there is provided a hollow cap 30, the outer portion of which is provided with a flange 31 which is designed to be pressed against an adjacent outer surface 32 of the valve body. The cap has an inside hollow portion 33 and within the cap is a spring keeper 34 of preferably a non-metallic material which is adapted to also serve the purpose of a seal. The spring keeper has a threaded central opening which accommodates a shank 35. At its upper end the shank has an abutment 36 which is designed to bear rotatably against the inside of the top of the cap. An adjusting nut 37 extends outwardly through an aperture in the cap in order to permit the shank to be rotated. A heavy coiled spring 39 is positioned between the spring keeper and the sheet 26 within the disc-like member and serves to hold the valve in seated position. When it is desired to change the pressure at which the valve will open, it is necessary only to adjust the nut 37 in one direction or another so as to increase or decrease the spring pressure upon the valve element. Seals 41 and 42 provide additional insurance against the possibility of a leak.

By reason of the fact that the stem 21 has a loose fit in the disc-like element and also by reason of the fact that the valve element itself is rounded, this combination permits the valve to seat tightly whether or not it is positioned in precise alignment with the central axis of the valve seat. By reason of this construction, the parts need not be precisely machined in order to provide a valve seat which will seat tightly without leaking and which will not release until the critical pressure has been reached.

I have therefore provided a relief valve of simple construction adapted to a wide variety of uses where high and low pressures are to be encountered and which is so simply constructed that it can be quickly and inexpensively made and can be replaced as to any of its several parts without necessity for subjecting it to a shop operation.

I claim:

1. In a hydraulic relief valve: a body portion provided with a through inlet passageway and a through relief passageway in spaced parallel relation thereto; a valve chamber in said body portion transversely interconnecting the passageways; a valve seat port between the chamber and said inlet passageway; a hollow cap for said valve chamber; a valve member including a head provided with a spherical seating surface, a flat rear surface and a stem, the spherical surface being adapted to variably contact the valve seat; a metallic annulus having an interrupted upstanding outer lip and a central aperture through which the stem may loosely extend; an annular non-metallic damping element on said annulus and including fingers extending through the interruptions of said lip interlocking said annulus and damping element, said fingers slidably contacting the walls of the valve chamber; and a compression spring bearing against said non-metallic element and the cap for yieldably holding the valve upon its seat.

2. In a hydraulic relief valve: a body portion provided with a through inlet passageway and a through relief passageway in spaced parallel relation thereto; a valve chamber in said body portion transversely interconnecting the passageways; a valve seat port between the chamber and said inlet passageway; a hollow cap for said valve chamber, the inner surfaces of said cap being provided with guides lying in planes parallel to the axis of the cap and valve chamber; a valve member including a head provided with a spherical seating surface, a flat rear surface and a stem, the spherical surface being adapted to variably contact the valve seat; a metallic annulus having an interrupted upstanding outer lip and a central aperture through which the stem may loosely extend; an annular non-metallic damping element on said annulus and including fingers extending through the interruptions of said lip interlocking said annulus and damping element, said fingers slidably contacting the walls of the valve chamber; an adjustable abutment in said cap cooperating with said guides and a compression spring bearing against the non-metallic element and the abutment in the cap for yieldably holding the valve upon its seat.

3. A relief valve comprising a body having a pair of spaced passages respectively for a fluid pressure line and for exhaust passage and a valve chamber extending from one side of the body into communication with the exhaust and the pressure line passage, a valve port and an annular valve seat therein between the chamber and said last mentioned passage, a valve member including a central stem and a valve element rounded at the seating area adapted normally to seat on the annular seat, a valve keeper loosely receiving the valve stem and having spaced outside lip elements removed from contact with the chamber wall, an annular nonmetallic member positioned within the lip elements and having fingers extending outwardly between the lip elements into sliding contact with the chamber wall and a cap and spring device for releasably holding the valve member in seated position.

4. A relief valve comprising a body having a pair of spaced passages respectively for a fluid pressure line and an exhaust and a valve chamber extending from one side of the body through the exhaust and laterally into the pressure line passage, a valve port and an annular valve seat therein between the chamber and said last passage, a valve member including a central stem and valve element rounding at the seating area adapted normally to seat on the annular seat, a valve keeper disc loosely receiving the stem at the center of said disc and having annular inside and outside lip elements, said outside lip element having interruptions thereon and spaced from the chamber wall, an annular nonmetallic spider member positioned between the lip elements and having fingers extending through the interruptions into sliding contact with the chamber wall and a cap and spring device for releasably holding the valve member in seated position.

5. A relief valve comprising a body having a pair of spaced parallel passages extending therethrough, a valve chamber extending inwardly from one side of the body into communication with said passages, an annular valve seat between the chamber and one of said passages and a valve unit in said chamber comprising a hollow cap adapted to close the outside end of the chamber, a valve member on the inside end of the unit including a valve element rounded throughout its seating area adapted to seat upon the annular valve seat, a valve keeper loosely engaging the valve element and having sides spaced from the chamber walls, wall-engaging projections spaced circumferentially about the valve keeper, a pressure spring bearing at one end against the keeper to hold said valve element in seated position, a combined seal and spring keeper at the other end of the spring in frictional sliding engagement with the inside of the cap and an adjusting shank movable relative to the cap and extending through the spring keeper and adapted to change the position of the spring keeper for varying the adjustment of the spring.

6. A relief valve comprising a body having a pair of spaced parallel passages extending therethrough, a valve chamber extending inwardly from one side of the body through one of said passages and communicating laterally with the other of said passages, an annular valve seat between the chamber and said last passage and a valve unit in said chamber comprising a hollow cap threadedly engaging the outside end of the chamber, a valve member on the inside end of the unit including a valve element rounded throughout its seating area adapted to seat upon the annular valve seat, a valve keeper loosely engaging the valve element and having sides spaced from the chamber walls, wall-engaging projections spaced circumferentially about the valve keeper, a pressure spring bearing at one end against the keeper to hold said valve element in seated position, a combined seal and spring keeper at the other end of the spring in frictional sliding engagement with the inside of the cap and an adjusting screw journaled in the cap and extending threadably through the spring keeper and adapted to change the position of the spring keeper for varying the adjustment of the spring.

7. In a relief valve, including a body having a through inlet passageway for pressure fluid and a spaced exhaust passage way, the combination of: a valve chamber extending from one side of the body transversely with regards to the inlet and exhaust passageways and into communication with said passageways, said valve chamber being of greater diameter than the inlet passageway and terminating in an annular valve seat including a valve port between said valve chamber and inlet passageway; a valve member having a central stem and a virtually hemispherical head adapted normally to sit on the annular seat; a centrally ported valve keeper loosely receiving the stem of the valve member, a non-metallic member carried by the valve keeper and having fingers extending therebeyond into contact with the walls of the valve chamber; a cap for the end of the valve chamber and spring means positioned between the cap and valve keeper for releasably holding the valve member in seated position.

FRANK B. HUNTER.

REFERENCES CITED

The following references are of record in the file of this patent:

UNITED STATES PATENTS

| Number | Name | Date |
| --- | --- | --- |
| 1,544,143 | Entwisle | June 30, 1925 |
| 1,962,740 | Jaworowski | June 12, 1934 |
| 2,014,948 | McNeal | Sept. 17, 1935 |
| 2,201,065 | Toolan | May 14, 1940 |
| 2,364,812 | Pierson | Dec. 12, 1944 |
| 2,388,406 | Haberland | Nov. 6, 1945 |

FOREIGN PATENTS

| Number | Country | Date |
| --- | --- | --- |
| 540,730 | Great Britain | Oct. 28, 1941 |